(12) United States Patent
Kim et al.

(10) Patent No.: US 6,456,652 B1
(45) Date of Patent: Sep. 24, 2002

(54) METHOD FOR OPTIMIZING FORWARD LINK COVERAGE IN CODE DIVISION MULTIPLE ACCESS (CDMA) NETWORK

(75) Inventors: Gun-yeob Kim, Yongin; Pyeong-hwan Wee, Seoul, both of (KR)

(73) Assignee: Samsung Electronics, Co., Ltd. (KR)

(*) Notice: Subject to any disclaimer, the term of this patent is extended or adjusted under 35 U.S.C. 154(b) by 0 days.

(21) Appl. No.: 09/281,140

(22) Filed: Mar. 29, 1999

(30) Foreign Application Priority Data

Mar. 28, 1998 (KR) ............................................ 98-10891

(51) Int. Cl.[7] .............................. H04Q 7/34; H04Q 7/20
(52) U.S. Cl. ...................... 375/224; 375/130; 370/335; 455/446
(58) Field of Search ................................. 375/130, 224, 375/227, 140, 141, 259; 370/335, 331, 441; 455/436, 423, 424, 439, 446, 67.4

(56) References Cited

U.S. PATENT DOCUMENTS

| | | | |
|---|---|---|---|
| 5,475,870 A | * 12/1995 | Weaver, Jr. et al. | ........ 455/67.1 |
| 5,519,888 A | 5/1996 | Hall et al. | ................ 455/249.1 |
| 5,737,705 A | 4/1998 | Ruppel et al. | ............... 455/452 |
| 5,822,686 A | 10/1998 | Lundberg et al. | ........ 455/161.3 |
| 5,859,839 A | 1/1999 | Ahlenius et al. | ............. 370/252 |
| 6,052,584 A | * 4/2000 | Harvey et al. | .............. 455/423 |

* cited by examiner

Primary Examiner—Don N. Vo
Assistant Examiner—Dung X. Nguyen
(74) Attorney, Agent, or Firm—Dilworth & Barrese, LLP

(57) ABSTRACT

Disclosed is a method for optimizing forward link coverage in a spread spectrum communication system, e.g., CDMA system. Spread spectrum test communication signals are transmitted from a base station at a known power level, using an antenna having a known beam direction. Orthogonal channel noise is simulated in order to model noise generated by wireless communication traffic existing in an operational communication system of many subscribers. A mobile station receives the test communication signals in a specific region of a cell, and measures signal quality parameters, e.g., RSSI, Ec/Io and a forward frame error rate (FFER), from the received signals and simulated noise. The measured signal quality parameters are compared to respective criteria. Each region is designating as being satisfactorily covered by the base station if the measured signal quality parameters substantially satisfy the criteria. Otherwise, base station equipment is adjusted to modify the transmission of the test communication signals, and the process is repeated.

17 Claims, 3 Drawing Sheets

METHOD FOR OPTIMIZING FORWARD LINK COVERAGE IN CODE DIVISION MULTIPLE ACCESS (CDMA) NETWORK

BACKGROUND

1. Field of the Invention

The present invention relates to an optimization method for a code division multiple access (CDMA) system, and more particularly, to a method for optimizing forward link coverage in a CDMA network.

2. Description of the Related Art

To optimize a CDMA system, it is desirable to conduct basic base station tests to optimize the coverage areas serviced by the base station, the hard handoff performance between exchanges, the call quality and the location-registration success rate. Coverage optimization is categorized into forward link coverage optimization and reverse link coverage optimization.

When setting up base station equipment to establish a desired coverage area to be serviced, conventional methods expand/contract the coverage area simply by increasing/decreasing the radio frequency (RF) power of the pilot signal transmitted from the base station. Coverage area expansion is necessary when the forward link coverage is less than the reverse link coverage; coverage area contraction is necessary for the opposite condition.

To further adjust the actual coverage area, adjustments to the base station antenna are made conventionally. For instance, the height of the antenna on the base station tower can be adjusted relative to the height of neighboring buildings. The antenna beam tilt may be adjusted to improve the signal strength in a certain region, or, to expand or contract the overall coverage area when adjustments to the base station output power are insufficient to do so.

In addition, measures can be taken to reduce interference resulting from an excessively large handoff area between two neighboring base stations. The antenna beam tilt can be adjusted by as much as three to five degrees to reduce the coverage area, and hence, the handoff area, to thereby remedy the interference problem. Moreover, to increase the receive signal strength from mobile stations in the reverse link, the azimuth direction of the base station antenna can be adjusted, particularly in an urban area to improve service.

While the above techniques may optimize cell coverage to a first order, there is a need for an improved coverage area optimization method which is more rigorous in taking into account real world environmental conditions. The present invention addresses this need.

SUMMARY OF THE INVENTION

The present invention is intended to provide a method for optimizing forward link coverage in CDMA network.

The present invention pertains to a method for establishing appropriate coverage per base station in a CDMA network, a method for establishing a basis for determination of coverage per base station in CDMA network, a method for establishing coverage per base station by adjusting system parameters and a method for performing cell coverage optimization of a CDMA network.

In one aspect of the invention, there is provided a method for optimizing forward link coverage in a spread spectrum communication system, e.g., a CDMA system. Spread spectrum test communication signals are transmitted from a base station at a known power level, using an antenna having a known beam direction. Orthogonal channel noise is simulated in order to model noise generated by wireless communication traffic existing in an operational communication system of many subscribers. A mobile station receives the test communication signals in a specific region of a cell area to be serviced by the base station, and measures signal quality parameters, e.g., RSSI, $E_C/I_o$ and a forward frame error rate (FFER), from the received signals and simulated noise. The measured signal quality parameters are compared to respective criteria. Each region of the cell is designating as being satisfactorily covered by the base station if the measured signal quality parameters substantially satisfy the criteria. Otherwise, base station equipment is adjusted to modify the transmission of the test communication signals, and the process is repeated.

Other objects and advantages of the invention will become apparent upon reading the detailed description and upon reference to the drawings.

DESCRIPTION OF THE PREFERRED EMBODIMENTS

An illustrative method for optimizing forward link coverage in a spread spectrum communication system in accordance with the invention will now be described. The method is preferably implemented with the aid of a computer program running on a base station computer to perform various calculations and to retrieve various data from memory associated with such calculations. The program may also be designed to automatically adjust certain base station equipment such as the RF output power or antenna beam direction in accordance with intermediate test results.

Figure 1:
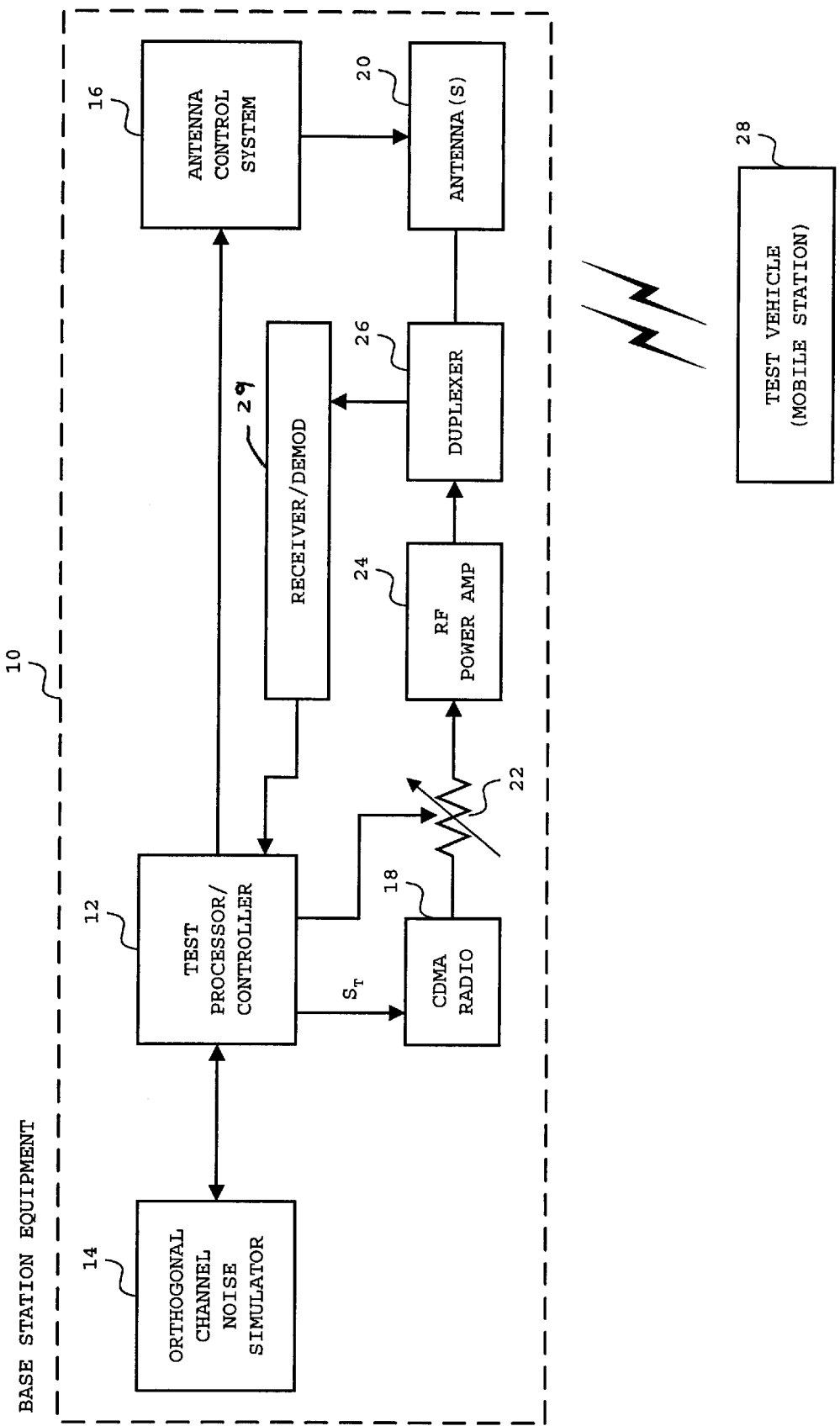
FIG. 1 is a block diagram of illustrative test equipment for conducting forward link coverage optimization tests.

Referring to FIG. 1, a simplified block diagram of an exemplary test setup to perform forward link optimization tests is shown. Base station equipment 10 includes a test processor/controller 12 which runs the above-noted test program. Controller 12, which may be the standard base station controller for the base station under evaluation, outputs a transmit communication signal or signals $S_T$ to a CDMA radio 18 during the tests. CDMA radio 18 spreads and modulates the signals in a conventional manner and provides the same to a variable transmit attenuator 22, the attenuation of which is controlled by controller 12. An orthogonal channel noise simulator 14 injects noise into the transmit signal $S_T$ to simulate environmental noise conditions. (Note that as an alternative, orthogonal channel noise can be simulated in the mobile station receiver, in which case block 14 would reside in the mobile station.) The output of attenuator 22 is supplied to RF power amplifier 24, and the amplified output thereof is provided to antenna 20 via duplexer 26. An antenna control system 16 controls the antenna beam direction of antenna 20 in response to commands of controller 12, by controlling tilt (elevation orientation) and azimuth orientation of the antenna. Note that antenna 20 is understood to be either a single, omnidirectional antenna covering the entire cell under evaluation, or multiple antennas, each dedicated to cover a specific sector of the cell. In the latter case, handoffs are performed between sectors and associated antennas as required. In any event, the forward link signals are transmitted by antenna 20 to a mobile station in a test vehicle 28 within the cell or corresponding sector during the course of the tests. Receive signals from test vehicle 28 are routed to test processor/controller 12 via antenna 20 and receiver/demodulator 29.

During the course of the tests, parameters such as RSSI (Received Signal Strength Indicator), $E_C/I_O$ (pilot chip energy to the total power spectral density), and FFER (Forward Frame Error Rate) are measured as part of the method to optimize forward link coverage. Also, simulations for different morphologies, antenna selections, power allocation per channel, traffic load over the forward link, RF transmit output by the base station, and forward power control parameters need to be appropriately optimized.

Figure 2A:
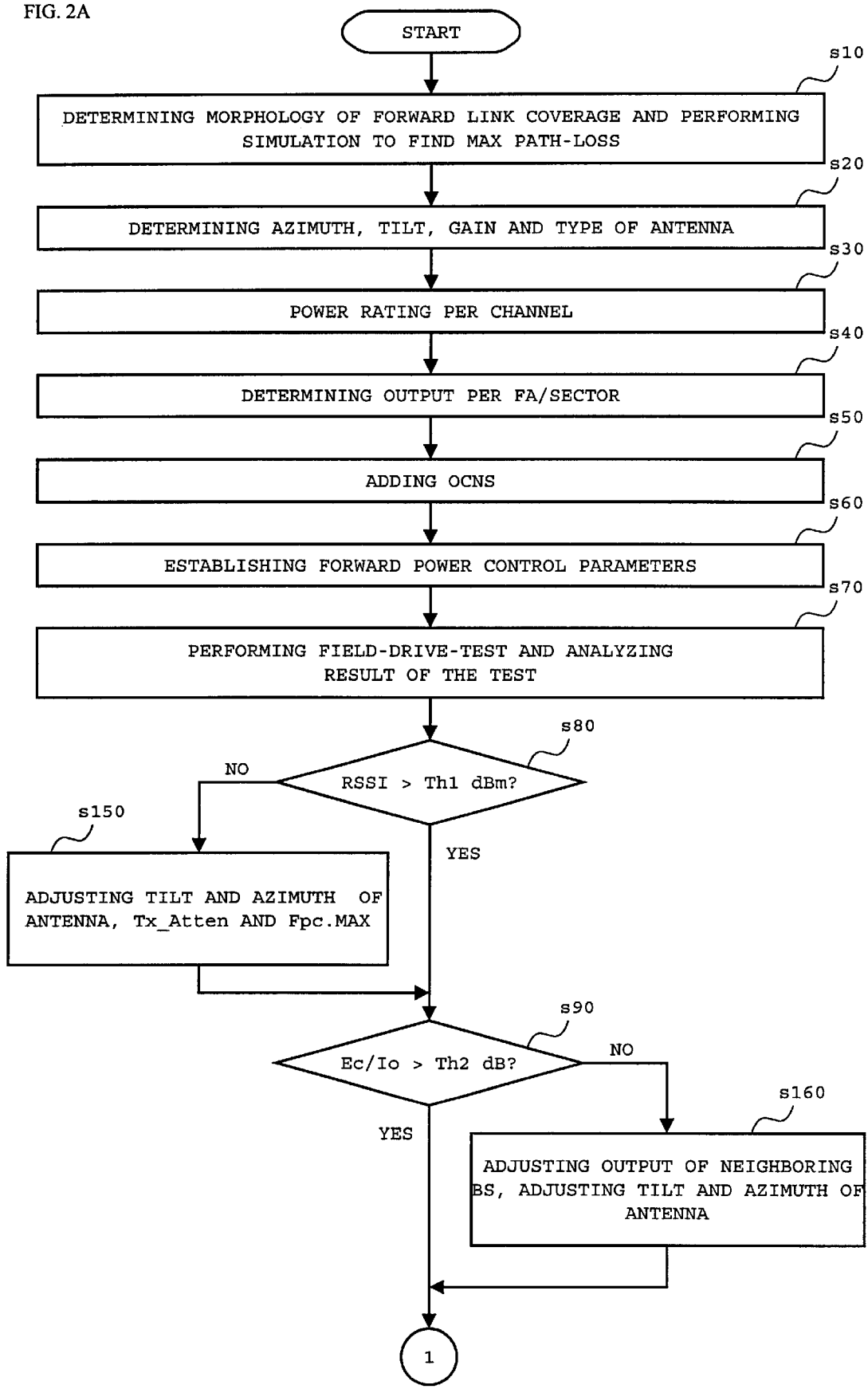
FIGS. 2A and 2B together comprise a flow chart illustrating a method for optimizing forward link coverage in CDMA network in accordance with the present invention.
Figure 2B:
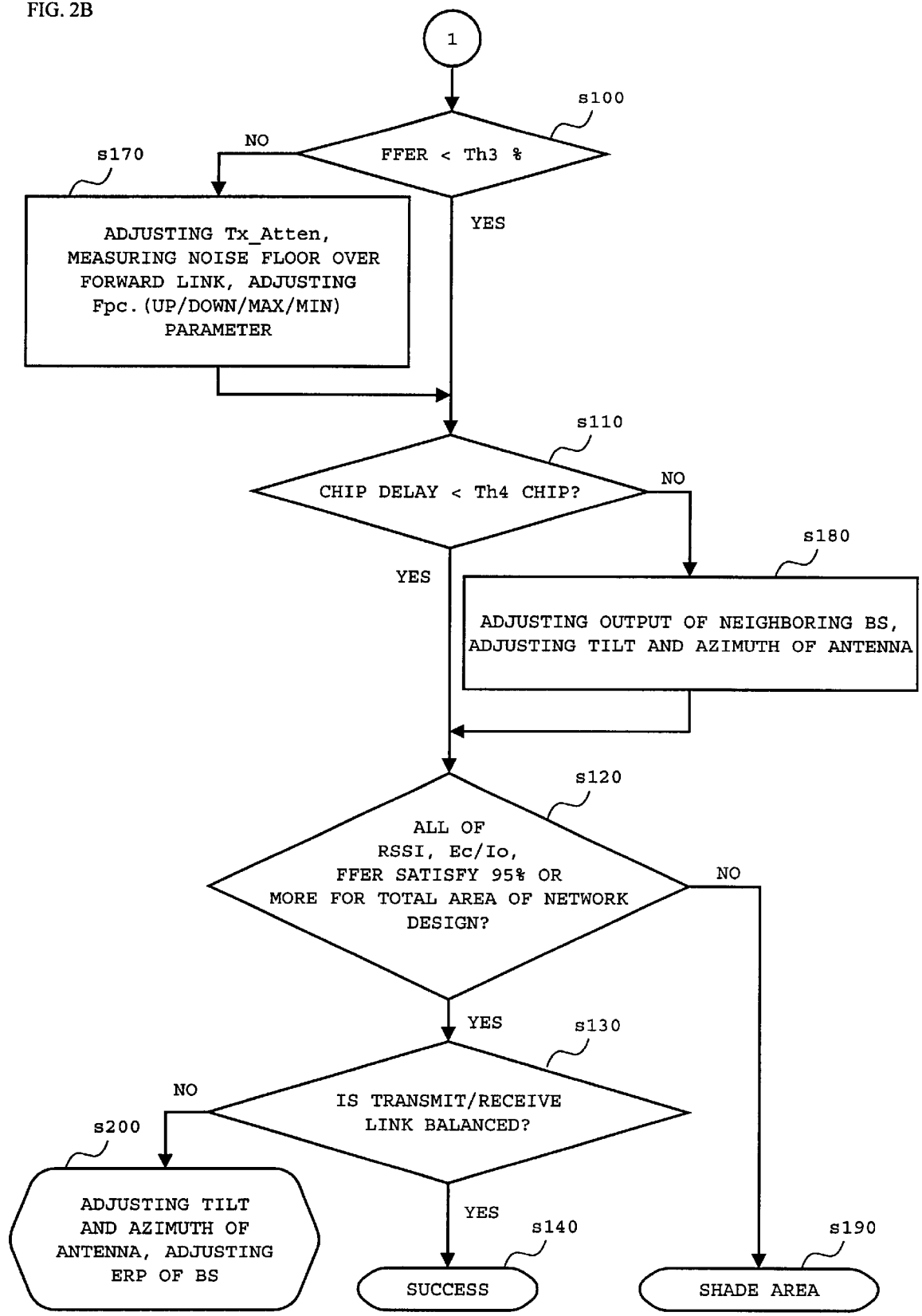

Referring to FIGS. 2A and 2B, an exemplary method for optimizing forward link coverage in a CDMA network using the equipment of FIG. 1 is illustrated. The various steps in the method are designated as S10, S20, etc. The process begins at S10, where an initial candidate morphology of the forward link coverage is determined, and a simulation is run on test processor 12 to find a maximum path loss ($L_{MAX}$) corresponding to the initial morphology. The morphology includes a candidate cell radius, taking into account environmental terrain and obstructions such as buildings. For instance, the cell area to be serviced may be hilly, requiring the base station antenna to be tilted. Conditions as these are input into the test program run on processor 12. Initially, the cell is established as a fixed region, such that the initial object of the optimization test is to determine how to meet predetermined performance criteria given the fixed cell region. Depending on the circumstances, such as whether the neighboring base stations have already been optimized, the cell area may or may not be allowed to change.

The maximum path loss $L_{MAX}$ (defined below) is estimated by selecting a path loss model to be used as the basis of the CDMA network design, in view of the morphology of the corresponding area.

A factor that determines the cell size over the forward link is the parameter $L_{MAX}$, which is the maximum tolerable transmission path-loss of the forward link. $L_{MAX}$ is dependent upon: the gain of both the base station and the mobile station antennas; noise; interference; and the RF power level output level of base station.

When the forward link coverage is optimized, the transmission loss of the forward link does not exceed the maximum tolerable transmission path-loss $L_{MAX}$. In addition, the RF energy transmitted by the base station is maintained less than a maximum level to prevent excessive energy from being radiated and to lessen interference in other cells. The coverage area is influenced not only by the expected RF energy to be transmitted from within the associated cell and from other cells, but also by the propagation loss between the mobile station and base station, propagation loss between the mobile station and interferers, cell loading and traffic distribution.

Once an appropriate value of $L_{MAX}$ has been determined, the next step (S20) is to determine an initial azimuth orientation, tilt, gain and antenna type (i.e., sector or omni) for the antenna 20. This determination is made by considering, among other things, the neighboring cells and the amount of traffic therein. Of course, unless multiple antennas are available for testing, the antenna gain is not a variable that can be readily varied during testing for a typical antenna.

Next, (S30) a suitable power rating per channel is computed. The power rating is preferably selected with the aim of ultimately satisfying the following equation:

$$\frac{E_c}{N_t} = \frac{\zeta_p \cdot P_c \cdot G_c \cdot G_m \cdot 1/L}{(N_o W)_m + I_o W + I_{oc} W}$$

where $P_C$ is the cell transmit power transmitted from the base station, $E_C/N_t$ is the ratio of pilot signal chip energy to the mobile's total input power spectral density, $\zeta_P$ is the fraction of cell transmit power allocated to the pilot channel, W is the bandwidth of the RF energy received by the mobile station (which is primarily a function of a bandpass filter at the receiver front end), $G_C$ and $G_m$ are the antenna gains of the base station antenna and mobile station antenna, respectively, including cable losses, L is propagation loss on the forward link, $(N_o W)_m$ is thermal noise power at the mobile's amplifier input, $I_o W$ is interference power due to same-cell transmissions (where same-cell means the cell in which the mobile station is located), and $I_{oc} W$ is interference power due to other-cell transmissions.

Thus, a target value is pre-established for $E_C/N_t$, which typically is intended to satisfy a specification in a standard protocol for a CDMA communication system. The base station transmit power level, antenna gain, etc., are initially set to values intended to satisfy the target $E_C/N_t$, as well as other target parameters.

Moreover, conditions of coverage for each channel are preferably as follows:
Pilot_Coverage=TrafficChannel_Coverage
Pilot_Coverage<=SyncChannel_Coverage
Pilot_Coverage<=PagingChannel_Coverage.

Following the power rating determination, the output per frequency assignment (FA) per sector of the coverage is determined (S40). For performing hard handoff, it is necessary to tune the output equally because the coverage per FA is allowed to be equal. Next, noise from the Orthogonal Channel Noise Simulator (OCNS) is added to the transmit signal (S50). A noise level appropriate for test environments of the forward link coverage is used. The OCNS may be embodied as an actual noise generator to add noise to the RF transmit signal. Instead, or additionally, the OCNS may be configured to introduce a noise effect in software, such as by adding a noise effect to the chip codes in the transmit channel. The orthogonal channel noise can also be simulated in the mobile station receiver.

The forward power control parameters are then established in step S60. This involves establishing related parameters, e.g., Nominal_Gain, Max_Tx_Gain, FER_Threshold, Big_Up_Delta (which represents a large incremental change in transmit power level) and Small_Up_Delta (representing a small incremental change in transmit power level).

A field-drive-test is then performed, and the results thereof are analyzed (S70). This involves the test vehicle 28 with the mobile station therein being driven in known areas of the cell and collecting RSSI data, FFER data and $E_C/I_0$ data, and then determining which regions of the cell satisfy prescribed criteria for these parameters. A unit area (e.g., 10 meters by 10 meters) is established as a coverage area when the amount of data satisfying the basis of service coverage is larger than a certain percentage, e.g., higher than 95%, among the measured data within the unit area to convert the specific vehicle data to an area.

The measured RSSI data is compared to a specific threshold Th1 in step S80. If the RSSI is less than Th1 (Threshold 1), the following steps are taken:
  i) the tilt and/or azimuth orientation of the antenna are adjusted (S150);

ii) the ERP (Effective Radiated Power) of the base station is adjusted by varying Tx_Atten, which is attenuator 22 of FIG. 1 (S150);

iii) adjusting the forward power control parameter representing the maximum allowable transmit gain (S150).

The measured $E_C/I_O$ data in the field vehicle test are compared to a specific threshold Th2 in step S90. If the $E_C/I_O$ is less than Th2 (Threshold 2), the following steps are taken:

i) the tilt and/or azimuth of the antenna in the service cell are adjusted (S160);

ii) the output of one or more neighboring base stations and the tilt and/or azimuth of antenna in the neighboring base station's service cell are adjusted (S160).

The measured FFER data of the field vehicle test are compared with another threshold Th3 in step S100. If the FFER is greater than Th3 (Threshold 3), the following steps are taken:

i) adjusting ERP (Effective Radiated Power) of the base station using Tx_Atten S170;

ii) resolving noise sources by measuring the noise floor over the forward link S170;

iii) adjusting the forward link RF transmit power by adjusting values of Up, Down, Max and Min among the forward power control parameters S170.

Next, a procedure of finding where chip delay exceeds Th4 (Threshold 4; plus/minus five chips) and remedying this situation is performed in S110. (Chip delay higher than Th4 is undesirable.) The output RF power levels of neighboring base stations are adjusted, and the tilt and azimuth of the antennas therein are then adjusted in step S180 to resolve any chip delay problem that may exist. For instance, a chip delay problem may occur when unnecessary signals from a distant base station are being received. Hence, the chip delay problem can be solved under these circumstances by adjusting the output of the distant base station which is the source of the problem.

In step S190, it is determined if any shade areas exist by comparing the RSSI, $E_C/I_O$, FFER with a criteria of the overall network design.

In step S130, it is determined whether transmit/receive (T/R) links are balanced. If a T/R imbalance is determined to exist as a result of the forward link coverage being less than the reverse link coverage, then a pilot acquisition will not be performed in an overlapped area between cells and the probability of handoff failure increases. If a T/R imbalance is determined to exist due to forward link coverage being greater than the reverse link coverage, then a handoff will not be performed in the overlapped area and pilot signals of both base stations act as interference.

Therefore, the forward link coverage optimization is re-adjusted if an imbalance between the forward and reverse link coverage is ascertained in step S130. Otherwise, forward link coverage is deemed to be satisfactory (S140).

From the foregoing, it will be appreciated that the present invention beneficially reduces the amount of time and/or human efforts otherwise required to change a large number of design parameters, and it obtains a precise optimization process by performing detailed optimization as in the aforedescribed steps.

In sum, embodiments of the present invention have the following advantages:

It is possible to obtain coverage properly reflecting a particular geographic cell area and neighboring environments by performing a coverage optimization after a basis of the network design is established, after initial consideration of the morphology of the corresponding area and radio characteristic.

Appropriate coverage may be obtained by establishing antenna type or antenna gain considering traffic load per area.

It is possible to simulate an actual environmental traffic load over the forward link by using an orthogonal code noise source, since the coverage is related to capacity.

Coverage optimization can be achieved by adjusting base station equipment when the RSSI, $E_C/I_O$, FFER and chip delay do not satisfy the performance specification of the network design.

While the invention is susceptible to various modification and alternative forms, specific embodiments thereof have been shown by way of example in the drawings and have been described herein in detail. It should be understood, however, that it is not intended to limit the invention to the particular forms disclosed. For instance, the invention may be applicable to other spread spectrum communication systems aside from a CDMA system. Therefore, the intention is to cover all modification, equivalents, and alternatives falling within the spirit and scope of the invention as defined by the appended claims.

What is claimed is:

1. A method for optimizing forward link coverage in a code division multiple access (CDMA) network comprising the steps of:

a) determining the morphology of a forward link coverage area;

b) determining azimuth orientation, tilt, gain and type of a base station antenna;

c) calculating power rating per channel for said coverage area;

d) determining RF output power per frequency assignment per sector for said coverage area;

e) simulating orthogonal channel noise which models noise generated by wireless communication traffic in an operational communication system of many subscribers;

f) establishing forward power control parameters;

g) performing a field-drive-test in which a mobile station receives test communication signals transmitted from said base station within specific regions of said coverage area, said mobile station measuring values for a received signal strength indicator (RSSI), a ratio ($E_C/I_O$) of pilot chip energy to total power spectral density, and a forward frame error rate (FFER);

h) comparing the measured RSSI value to a first threshold;

i) comparing said measured ratio ($E_C/I_O$) to a second threshold;

j) comparing said measured FFER to a third threshold;

k) determining if chip delay measured at the mobile station exceeds a fourth threshold, and if so, making adjustments to base station equipment to attempt to reduce said chip delay;

l) determining whether a shade area exists by comparing said RSSI, $E_C/I_O$, FFER with a basis of overall network design;

m) determining whether transmit/receive links are balanced; and n) designating forward link coverage as being satisfied when comparisons to said first, second and third thresholds are favorable and the transmit/receive links are balanced; otherwise, making adjustments to base station equipment to attempt to correct unfavorable comparisons to said thresholds and to correct an imbalance between the transmit/receive links.

2. The method as set forth in claim 1, wherein a maximum path loss is estimated by selecting a path loss model to be used as the basis of network design, said maximum path loss being dependent upon the determined morphology.

3. The method as set forth in claim 1, wherein said azimuth, tilt, gain and type of antenna are determined by considering neighboring cells of the corresponding area and an amount of communication traffic in said step (b).

4. The method as set forth in claim 1, wherein traffic channel coverage satisfies a condition: Pilot_Coverage= TrafficChannel_Coverage in said step (c).

5. The method as set forth in claim 4, wherein sync channel coverage satisfies a condition Pilot—Coverage<= SyncChannel—Coverage in said step (c).

6. The method as set forth in claim 5, wherein paging channel coverage satisfies a condition Pilot_Coverage<= PagingChannel_Coverage in said step (c).

7. The method as set forth in claim 1, wherein said forward power control parameters include the values, Nominal_Gain, Max_Tx_Gain, FER_Threshold, Big_Up_Delta, Small_Up_Delta in said step of establishing forward power control parameters.

8. The method as set forth in claim 1, wherein a unit data is established as a coverage area when the number of data satisfying the basis of service coverage becomes 95% or more among the measured data within the unit area to convert the specific vehicle data to an area in said step of performing field-drive-test and analyzing the result of said field-drive-test.

9. The method as set forth in claim 1, wherein the tilt and azimuth orientation of the antenna are adjusted if said measured RSSI is below said first threshold.

10. The method as set forth in claim 1, wherein an Effective Radiated Power (ERP) of the base station is adjusted using a variable attenuator if said measured RSSI is below said first threshold.

11. The method as set forth in claim 1, wherein the maximum among the forward power control parameters is adjusted if said RSSI is below said first threshold.

12. The method as set forth in claim 1, wherein the tilt and azimuth of said base station antenna are adjusted if said measured $E_{C/IO}$ is below said second threshold.

13. The method as set forth in claim 1, wherein the output of at least one neighboring base station and the tilt and azimuth of an associated neighboring base station antenna are adjusted if said measured $E_C/I_O$ is below said second threshold.

14. The method as set forth in claim 1, wherein an Effective Radiated Power (ERP) of said base station is adjusted using a variable attenuator if said measured FFER is higher than said third threshold.

15. The method as set forth in claim 1, wherein noise sources are resolved by measuring noise floor over the forward link if said measured FFER is higher than said third threshold.

16. The method as set forth in claim 1, wherein the values of Up, Down, Max and Min among said forward power control parameters are adjusted if said measured FFER is higher than said third threshold.

17. The method as set forth in claim 1, wherein said adjustments to base station equipment of step (k) include adjustments to tilt and azimuth orientation of said base station antenna.

* * * * *